United States Patent
Waldbauer, Jr. et al.

(10) Patent No.: US 10,883,198 B2
(45) Date of Patent: Jan. 5, 2021

(54) BIO-DERIVED POLYURETHANE FIBER

(71) Applicant: INVISTA NORTH AMERICA S.A R.L., Wilmington, DE (US)

(72) Inventors: Robert O. Waldbauer, Jr., Waynesboro, VA (US); Norman J. D'Allura, Waynesboro, VA (US)

(73) Assignee: The LYCRA Company LLC, Wilmington, DE (US)

( * ) Notice: Subject to any disclaimer, the term of this patent is extended or adjusted under 35 U.S.C. 154(b) by 174 days.

(21) Appl. No.: 15/308,480

(22) PCT Filed: May 5, 2015

(86) PCT No.: PCT/US2015/029274
§ 371 (c)(1),
(2) Date: Nov. 2, 2016

(87) PCT Pub. No.: WO2015/171631
PCT Pub. Date: Nov. 12, 2015

(65) Prior Publication Data
US 2017/0051436 A1  Feb. 23, 2017

Related U.S. Application Data

(60) Provisional application No. 61/988,689, filed on May 5, 2014.

(51) Int. Cl.
| | |
|---|---|
| *D01F 6/70* | (2006.01) |
| *D01D 5/04* | (2006.01) |
| *D01D 5/06* | (2006.01) |
| *D01F 1/02* | (2006.01) |
| *D01F 1/10* | (2006.01) |
| *C08G 18/76* | (2006.01) |
| *C08G 18/48* | (2006.01) |
| *C08G 18/75* | (2006.01) |

(52) U.S. Cl.
CPC ........... *D01F 6/70* (2013.01); *C08G 18/4854* (2013.01); *C08G 18/755* (2013.01); *C08G 18/7621* (2013.01); *C08G 18/7671* (2013.01); *D01D 5/04* (2013.01); *D01D 5/06* (2013.01); *D01F 1/10* (2013.01); *D01F 1/02* (2013.01); *D10B 2331/10* (2013.01); *D10B 2501/021* (2013.01); *D10B 2509/026* (2013.01)

(58) Field of Classification Search
CPC ............ C08G 18/7671; C08G 18/7621; C08G 18/755; C08G 18/4854; D01F 6/70; D01F 1/10; D01F 1/02
See application file for complete search history.

(56) References Cited

U.S. PATENT DOCUMENTS

| | | | |
|---|---|---|---|
| 6,867,260 B2 | 3/2005 | Datta et al. | |
| 8,067,214 B2 | 11/2011 | Burk et al. | |
| 2006/0270821 A1 | 11/2006 | Palmer, Jr. et al. | |
| 2006/0276610 A1 | 12/2006 | Jenny et al. | 524/44 |
| 2010/0152405 A1 | 6/2010 | Sunkara | 528/65 |
| 2010/0216958 A1 | 8/2010 | Peters et al. | |
| 2013/0172512 A1 | 7/2013 | Lin et al. | 528/66 |
| 2013/0203141 A1 | 8/2013 | Liao et al. | |
| 2013/0217086 A1* | 8/2013 | Lee | C12P 7/18 435/135 |
| 2014/0030773 A1 | 1/2014 | Lee et al. | |
| 2015/0087789 A1 | 3/2015 | Utsunomiya et al. | |
| 2015/0337342 A1* | 11/2015 | Zhang | C12N 15/52 435/110 |

FOREIGN PATENT DOCUMENTS

| | | |
|---|---|---|
| EP | 2690109 A1 | 1/2014 |
| JP | 07-118253 | 5/1995 |
| JP | 2008-540765 | 11/2008 |
| JP | 2012-219066 | 11/2012 |
| KR | 10-2013-0094115 A † | 8/2013 |
| WO | 2008/085397 A1 | 7/2008 |
| WO | 2011/087943 A2 † | 7/2011 |
| WO | 2013/183593 | 12/2013 |
| WO | 2015/171631 A1 | 11/2015 |

OTHER PUBLICATIONS

International Search Report and Written Opinion Received for PCT Patent Application No. PCT/US2015/029274, dated Jul. 22, 2015, 9 pages.
International Preliminary Report on Patentability Received for PCT Patent Application No. PCT/US2015/029274, dated Nov. 17, 2016, 8 pages.
Couper, Monroe, "Handbook of Fiber Science and Technology: vol. III, High Technology Fibers Part A", Marcel Dekker, Inc: 1985, pp. 51-85.
Yim et al., "Metabolic Engineering of *Escherichia coli* for Direct Production of 1,4-Butanediol", Nature Chemical Biology, vol. 7, 2011, pp. 445-452.
Office Communication in Japanese Patent Application No. 2016-567040 with English language translation.
English language translation of Fiber Engineering [2] Production, Structures and Physical Properties of Fibers, Japan, The Textile Machinery Society of Japan 1996, p. 57-59.
Zeikus et al. "Biotechnology of succinic acid production and markets for derived industrial products" Appl. Microbiol. Biotechnol. 1999 51:545-552.

\* cited by examiner
† cited by third party

*Primary Examiner* — Joseph S Del Sole
*Assistant Examiner* — Mohamed K Ahmed Ali
(74) *Attorney, Agent, or Firm* — Bridget C. Sciamanna; Kathleen Tyrrell

(57) ABSTRACT

Included are elastomeric fibers and method for preparing such fibers, which include a bio-derived butanediol. The bio-derived butanediol is used to prepare a polymeric glycol composition, which is contacted with a diisocyanate and spun to provide an elastomeric fiber.

10 Claims, No Drawings

BIO-DERIVED POLYURETHANE FIBER

BACKGROUND OF THE INVENTION

Field of the Invention

Included are elastic fibers prepared by a solution-spinning process such as spandex including polyurethane compositions derived from a polymeric glycol where the polymeric glycol has been derived, at least in part, from a bio-derived 1,4-butane-diol.

Description of the Related Art

Elastic fibers such as spandex (also known as elastane) are used today in a wide variety of products. Examples include hosiery, swimwear, clothing, hygiene products such as diapers, among many others. The polyurethane compositions that are used to prepare spandex fibers have some limitations that have led to modifications such as including additives or altering the polymer composition to prevent degradation and to enhance dyeability, among many others. These elastic fibers are currently prepared using a polymeric glycol or polyol which is derived from non-renewable resources.

SUMMARY OF THE INVENTION

Methods are currently known for preparation of 1,4-butanediol from renewable resources, i.e., bio-derived resources. There is a need for new spandex fibers that will maintain the favorable properties of the fiber, such as elasticity, which are needed for commercial products such as garments, swimwear, and hosiery, while allowing for a inclusion of bio-derived, renewable and/or sustainable sources.

The invention is as described in the claims.

DETAILED DESCRIPTION OF THE INVENTION

Included are elastomeric fibers that are derived in part from a renewable/sustainable biological source. Any of the fibers described herein can be single component, bicomponent or multiple component fibers. For the sake of clarity, definitions are included below.

Definitions

As used herein, "solvent" refers to an organic solvent such as dimethylacetamide (DMAC), dimethylformamide (DMF) and N-methyl pyrrolidone.

The term "solution-spinning" as used herein includes the preparation of a fiber from a solution which can be either a wet-spun or dry-spun process, both of which are common techniques for fiber production.

The term "multiple component fiber" as used herein means a fiber having at least two separate and distinct regions of different compositions with a discernable boundary, i.e., two or more regions of different compositions that are continuous along the fiber length. This is in contrast to polyurethane or polyurethaneurea blends wherein more than one composition is combined to form a fiber without distinct and continuous boundaries along the length of the fiber. The terms "multiple component fiber" and "multicomponent fiber" are synonymous and are used interchangeably herein.

The term "compositionally different" is defined as two or more compositions including different polymers, copolymers or blends or two or more compositions having one or more different additives, where the polymer included in the compositions may be the same or different. Two compared compositions are also "compositionally different" where they include different polymers and different additives.

The terms "boundary," "boundaries," and "boundary region" are used to describe the point of contact between different regions of the multicomponent fiber cross-section. This point of contact is "well-defined" where there is minimal or no overlap between the compositions of the two regions. Where overlap does exist between two regions, the boundary region will include a blend of the two regions. This blended region may be a separate homogenously blended section with separate boundaries between the blended boundary region and each of the other two regions. Alternatively, the boundary region may include a gradient of higher concentration of the composition of the first region adjacent to the first region to a higher concentration of the composition of the second region adjacent to the second region.

In some embodiments are multi-component, or bicomponent fibers including a solution-spun polyurethaneurea composition, which is also referred to as spandex or elastane. The compositions for the different regions of the multi-component fibers include different polyurethaneurea compositions in that the polymer is different, the additives are different, or both the polymer and additives are different. By providing a multiple component fiber, a variety of different benefits can be realized. For example, reduced cost due to use of additives or a more expensive polyurethaneurea composition in only one region of the fiber while maintaining comparable properties. Also, improved fiber properties can be realized by the introduction of new additives that would be incompatible with a conventional monocomponent spandex yarn or through a synergistic effect of combining two compositions.

In order to help insure suitability of the spandex fiber to yarn processing, fabric manufacturing, and consumer satisfaction when contained in a garment, a number of additional properties can be adjusted. Spandex compositions are well-known in the art and may include may variations such as those disclosed in Monroe Couper. Handbook of Fiber Science and Technology: Volume III, High Technology Fibers Part A. Marcel Dekker, INC: 1985, pages 51-85. Some examples of those are listed here.

Spandex fiber may contain a delusterant such as $TiO_2$, or another other particle with at refractive index different from the base fiber polymer, at levels of 0.01-6% by weight. A lower level is also useful when a bright or lustrous look is desired. As the level is increased the surface friction of the yarn may change which can impact friction at surfaces the fiber contacts during processing.

The fiber breaking strength as measured in grams of force to break per unit denier (tenacity in grams/denier) may be adjusted from 0.7 to 1.2 grams/denier dependent on molecular weight and/or spinning conditions.

The denier of the fiber may be produced from 5-2000 based on the desired fabric construction. A spandex yarn of denier 5-30 denier may have a filament count of between 1 and 5, and a yarn of denier 30-2000 may have a filament count from 2 to 200. The fiber may be used in fabrics of any sort (wovens, warp knits, or weft knits) in a content from 0.5% to 100% depending on the desired end use of the fabric.

The spandex yarn may be used alone or it may be plied, twisted, co-inserted, or mingled with any other yarn such as those suitable for apparel end uses, as recognized by the FTC (Federal Trade Commission). This includes, but is not limited to, fibers made from nylon, polyester, multi-component polyester or nylon, cotton, wool, jute, sisal, help, flax, bamboo, polypropylene, polyethylene, polyfluorocarbons, rayon, cellulosics of any kind, and acrylic fibers.

The spandex fiber may have a lubricant or finish applied to it during the manufacturing process to improve downstream processing of the fiber. The finish may be applied in a quantity of 0.5 to 10% by weight.

The spandex fiber may contain additives to adjust the initial color of the spandex or to prevent or mask the effects of yellowing after exposure to elements that can initiate polymer degradation such as chlorine, fumes, UV, NOx, or burnt gas. A spandex fiber may be made to have a "CIE" whiteness in the range of 40 to 160.

Polyurethaneurea and Polyurethane Compositions

Polyurethaneurea compositions useful for preparing fiber or long chain synthetic polymers that include at least 85% by weight of a segmented polyurethane. Typically, these include a polymeric glycol or polyol which is reacted with a diisocyanate to form an NCO-terminated prepolymer (a "capped glycol"), which is then dissolved in a suitable solvent, such as dimethylacetamide, dimethylformamide, or N-methylpyrrolidone, and then reacted with a difunctional chain extender. Polyurethanes are formed when the chain extenders are diols (and may be prepared without solvent). Polyurethaneureas, a sub-class of polyurethanes, are formed when the chain extenders are diamines. In the preparation of a polyurethaneurea polymer which can be spun into spandex, the glycols are extended by sequential reaction of the hydroxy end groups with diisocyanates and one or more diamines. In each case, the glycols must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

Suitable polyol components (also referred to as polymeric glycols) include polyether glycols, polycarbonate glycols, and polyester glycols of number average molecular weight of about 600 to about 3,500. Mixtures of two or more polyols or copolymers can be included. The polyol component desirably includes at least one polymer derived from a bio-derived 1,4-butanediol.

Methods of Synthesizing 1,4-butanediol 1,4-butanediol (BDO) can be synthesized from succinate or α-ketoglutarate (also known as 2-oxoglutarate) via 4-hydroxybutyrate in a recombinant microorganism that includes a 2-oxoglutarate decarboxylase or a succinyl-CoA synthetase, a succinate semialdehyde dehydrogenase, a 4-hydroxybutyrate dehydrogenase, a 4-hydroxybutyrate-CoA transferase, a 4-hydroxybutyrate-CoA reductase, and an alcohol dehydrogenase. In such a recombinant microorganism, succinate can be converted to succinyl-CoA using a succinyl-CoA synthetase, followed by conversion of succinyl-CoA to succinyl semialdehyde using a CoA-dependent succinate semialdehyde dehydrogenase. Succinyl semialdehyde can be converted to 4-hydroxybutyrate using a 4-hydroxybutyrate dehydrogenase, followed by conversion of 4-hydroxybutyrate to 4-hydroxybutyryl-CoA using a 4-hydroxybutyrate-CoA transferase then to 4-hydroxybutyraldehyde using a 4-hydroxybutyrate-CoA reductase. 4-hydroxybutyraldehyde can be converted to BDO using an alcohol dehydrogenase. In some embodiments, a 2-oxoglutarate decarboxylase is used to convert α-ketoglutarate to succinyl semialdehyde, which can be converted to BDO as described above. See, for example, Yim, et al., Nat. Chem. Biol., 7:445-452 (2011); and U.S. Pat. No. 8,067,214. See also EP2690109 A1. It is understood that one or more (e.g., two, three, four, five, or six) of the above steps can be performed in vitro using isolated or purified forms of relevant enzymes (e.g., enzymes isolated or purified from recombinant cells expressing them). Steps performed in recombinant cells before and/or after those performed using isolated/purified enzymes can be performed by providing the appropriate enzyme substrates to the recombinant cells.

BDO can be dehydrated to form tetrahydrofuran (THF) at high temperatures in the presence of an acid catalyst, then polymerized to form polyTHF (also known as poly(tetramethylene ether) glycol). Alternatively, the THF can be copolymerized, as described below.

Examples of polyether polyols that can be used include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred, and a poly(tetramethylene ether) glycol of molecular weight of about 1,700 to about 2,100, such as Terathane® 1800 (INVISTA of Wichita, Kans.) with a functionality of 2, is one example of a specific suitable polyol. Co-polymers can include poly(tetramethylene-co-ethyleneether) glycol.

Examples of polyester polyols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol with a melting temperature of about 5° C. to about 50° C. is an example of a specific polyester polyol.

Examples of polycarbonate polyols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is an example of a specific polycarbonate polyol.

The diisocyanate component can also include a single diisocyanate or a mixture of different diisocyanate including an isomer mixture of diphenylmethane diisocyanate (MDI)

containing 4,4'-methylene bis(phenyl isocyanate) and 2,4'-methylene bis(phenyl isocyanate). Any suitable aromatic or aliphatic diisocyanate can be included. Examples of diisocyanates that can be used include, but are not limited to, 1-isocyanato-4-[(4-isocyanatophenyl)methyl]benzene, 1-isocyanato-2-[(4-cyanatophenyl)methyl]benzene, bis(4-isocyanatocyclohexyl)methane, 5-isocyanato-1-(isocyanatomethyl)-1,3,3-trimethylcyclohexane, 1,3-diisocyanato-4-methyl-benzene, 2,2'-toluenediisocyanate, 2,4'-toluenediisocyanate, and mixtures thereof. Examples of specific polyisocyanate components include Mondur® ML (Bayer), Lupranate® MI (BASF), and Isonate® 50 O,P' (Dow Chemical), and combinations thereof.

A chain extender may be either water or a diamine chain extender for a polyurethaneurea. Combinations of different chain extenders may be included depending on the desired properties of the polyurethaneurea and the resulting fiber. Examples of suitable diamine chain extenders include: hydrazine; 1,2-ethylenediamine; 1,4-butanediamine; 1,2-butanediamine, 1,3-butanediamine; 1,3-diamino-2,2-dimethylbutane; 1,6-hexamethylenediamine; 1,12-dodecanediamine; 1,2-propanediamine; 1,3-propanediamine; 2-methyl-1,5-pentanediamine; 1-amino-3,3,5-trimethyl-5-aminomethylcyclohexane; 2,4-diamino-1-methylcyclohexane; N-methylamino-bis(3-propylamine); 1,2-cyclohexanediamine; (1,4-cyclohexanediamine; 4,4'-methylene-bis(cyclohexylamine); isophorone diamine; 2,2-dimethyl-1,3-propanediamine; meta-tetramethylxylenediamine; 1,3-diamino-4-methylcyclohexane, 1,3-cyclohexane-diamine; 1,1-methylene-bis(4,4'-diaminohexane); 3-aminomethyl-3,5,5-trimethylcyclohexane; 1,3-pentanediamine (1,3-diaminopentane); m-xylylene diamine; and Jeffamine® (Texaco).

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy) benzene, and 1,4-butanediol and mixtures thereof.

A blocking agent which is a monofunctional alcohol or a monofunctional dialkylamine may optionally be included to control the molecular weight of the polymer. Blends of one or more monofunctional alcohols with one or more dialkylamine may also be included.

Examples of monofunctional alcohols useful with the present invention include at least one member selected from the group consisting of aliphatic and cycloaliphatic primary and secondary alcohols with 1 to 18 carbons, phenol, substituted phenols, ethoxylated alkyl phenols and ethoxylated fatty alcohols with molecular weight less than about 750, including molecular weight less than 500, hydroxyamines, hydroxymethyl and hydroxyethyl substituted tertiary amines, hydroxymethyl and hydroxyethyl substituted heterocyclic compounds, and combinations thereof, including furfuryl alcohol, tetrahydrofurfuryl alcohol, N-(2-hydroxyethyl)succinimide, 4-(2-hydroxyethyl)morpholine, methanol, ethanol, butanol, neopentyl alcohol, hexanol, cyclohexanol, cyclohexanemethanol, benzyl alcohol, octanol, octadecanol, N,N-diethylhydroxylamine, 2-(diethylamino)ethanol, 2-dimethylaminoethanol, and 4-piperidineethanol, and combinations thereof.

Examples of suitable mono-functional dialkylamine blocking agents include: N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tert-butyl-N-isopropylamine, N-isopropyl-N-cyclohexylamine, N-ethyl-N-cyclohexylamine, N,N-diethanolamine, and 2,2,6,6-tetramethylpiperidine.

Non-Polyurethaneurea Polymers

Other polymers that are useful for combination with fiber described herein include other polymers which are soluble or can be included in particulate form. The soluble polymers may be dissolved in the polyurethaneurea solution or coextruded with the solution spun polyurethaneurea composition. The result of co-extrusion can be a bicomponent or multiple component fiber having a side-by-side, concentric sheath-core, or eccentric sheath-core cross-section where one component is polyurethaneurea solution and the other component contains another polymer. Examples of other soluble polymers include polyurethanes (as described above), polyamides, acrylics, and polyaramides, among others.

Other polymers that are useful with the multiple component and/or bicomponent fibers of the present invention include other semicrystalline insoluble polymers included as a particulate form. Useful polyamides include nylon 6, nylon 6/6, nylon 10, nylon 12, nylon 6/10, and nylon 6/12. Useful polyolefins include polymers prepared from $C_2$ to $C_{20}$ monomers. This includes copolymers and terpolymers such as ethylene-propylene copolymers. Examples of useful polyolefin copolymers are disclosed in U.S. Pat. No. 6,867,260 to Datta et al., incorporated herein by reference.

Fiber Cross-Section Configurations

A variety of different cross-sections are useful with the invention of some embodiments. These include single component (which can be a blend of different polymers), bicomponent or multiple component concentric or eccentric sheath-core and bicomponent or multiple component side-by-side.

Where a sheath-core or side-by-side cross-sections provided, it includes a boundary area between at least two compositionally different polyurethaneurea compositions. The boundary appears be a well-defined boundary in each of these FIGURES, but the boundary may include a blended region. Where the boundary includes a blended region, the boundary itself is a distinct region which is a blend of the compositions of the first and second (or third, fourth, etc.) regions. This blend may be either a homogenous blend or may include a concentration gradient from the first region to the second region.

Additives

Classes of additives that may be optionally included in polyurethaneurea compositions are listed below. An exemplary and non-limiting list is included. However, additional additives are well-known in the art. Examples include: anti-oxidants, UV stabilizers, colorants, pigments, cross-linking agents, phase change materials (paraffin wax), anti-microbials, minerals (i.e., copper), microencapsulated additives (i.e., aloe vera, vitamin E gel, aloe vera, sea kelp, nicotine, caffeine, scents or aromas), nanoparticles (i.e., silica or carbon), nano-clay, calcium carbonate, talc, flame retardants, antitack additives, chlorine degradation resistant additives, vitamins, medicines, fragrances, electrically conductive additives, dyeability and/or dye-assist agents (such as quaternary ammonium salts). Other additives which may be added to the polyurethaneurea compositions include adhesion promoters, anti-static agents, anti-creep agents, optical brighteners, coalescing agents, electroconductive additives, luminescent additives, lubricants, organic and inorganic fillers, preservatives, texturizing agents, thermochromic additives, insect repellants, and wetting agents, stabilizers (hindered phenols, zinc oxide, hindered amine), slip agents (silicone oil) and combinations thereof.

The additive may provide one or more beneficial properties including: dyeability, hydrophobicity (i.e., polytetrafluoroethylene (PTFE)), hydrophilicity (i.e., cellulose), friction control, chlorine resistance, degradation resistance (i.e., antioxidants), adhesiveness and/or fusibility (i.e., adhesives and adhesion promoters), flame retardance, antimicrobial behavior (silver, copper, ammonium salt), barrier, electrical conductivity (carbon black), tensile properties, color, luminescence, recyclability, biodegradability, fragrance, tack control (i.e., metal stearates), tactile properties, setability, thermal regulation (i.e., phase change materials), nutriceutical, delustrant such as titanium dioxide, stabilizers such as hydrotalcite, a mixture of huntite and hydromagnesite, UV screeners, and combinations thereof.

The bicomponent spandex fibers may also be prepared by separate capillaries to form separate filaments which are subsequently coalesced to form a single fiber.

Process of Making Fibers

The fiber of some embodiments is produced by solution spinning (either wet-spinning or dry spinning) of the polyurethane-urea polymer from a solution with conventional urethane polymer solvents (e.g., DMAc). The polyurethan-eurea polymer solutions may include any of the compositions or additives described above. The polymer is prepared by reacting an organic diisocyanate with appropriate glycol, at a mole ratio of diisocyanate to glycol in the range of 1.6 to 2.3, preferably 1.8 to 2.0, to produce a "capped glycol". The capped glycol is then reacted with a mixture of diamine chain extenders. In the resultant polymer, the soft segments are the polyether/urethane parts of the polymer chain. These soft segments exhibit melting temperatures of lower than 60° C. The hard segments are the polyurethane/urea parts of the polymer chains; these have melting temperatures of higher than 200° C. The hard segments amount to 5.5 to 9%, preferably 6 to 7.5%, of the total weight of the polymer.

In one embodiment of preparing fibers, the polymer solutions containing 30-40% polymer solids are metered through desired arrangement of distribution plates and orifices to form filaments. Extruded filaments are dried by introduction of hot, inert gas at 300° C.-400° C. and a gas:polymer mass ratio of at least 10:1 and drawn at a speed of at least 400 meters per minute (preferably at least 600 m/min) and then wound up at a speed of at least 500 meters per minute (preferably at least 750 m/min). Standard process conditions are well-known in the art.

Yarns formed from elastic fibers made in accordance with the present invention generally have a tenacity at break of at least 0.6 cN/dtex, a break elongation of at least 400%, an unload modulus at 300% elongation of at least 27 mg/dtex.

Strength and elastic properties of the spandex were measured in accordance with the general method of ASTM D 2731-72, For the examples reported in Tables below, spandex filaments having a 5 cm gauge length were cycled between 0% and 300% elongation at a constant elongation rate of 50 cm per minute. Modulus was determined as the force at 100% (M100) and 200% (M200) elongation on the first cycle and is reported in grams. Unload modulus (U200) was determined at 200% elongation on the fifth cycle and is reported in the Tables in grams. Percent elongation at break and force at break was measured on the sixth extension cycle.

Percent set was determined as the elongation remaining between the fifth and sixth cycles as indicated by the point at which the fifth unload curve returned to substantially zero stress. Percent set was measured 30 seconds after the samples had been subjected to five 0-300% elongation/relaxation cycles. The percent set was then calculated as % Set=100(Lf−Lo)/Lo, where Lo and Lf are the filament (yarn) length, when held straight without tension, before (Lo) and after (Lf) the five elongation/relaxation cycles.

The features and advantages of the present invention are more fully shown by the following examples which are provided for purposes of illustration, and are not to be construed as limiting the invention in any way.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A method for preparing an elastomeric fiber comprising:
(a) providing a polymeric glycol composition;
(b) contacting said polymeric glycol composition with at least one diisocyanate;
(c) dissolving a capped glycol in a solvent to provide a capped glycol solution;
(d) contacting the capped glycol solution with a chain extender composition; and
(e) spinning the solution to form the elastomeric fiber;
wherein said polymeric glycol composition includes at least one polymeric glycol which is synthesized from succinate or α-ketoglutarate using a bio-derived 1,4-butanediol obtained from a recombinant host or enzymes of the recombinant host comprising 2-oxoglutarate decarboxylase or a succinyl-CoA-synthetase which is converted to tetrahydrofuran prior to polymerization to form the polymeric glycol composition, and wherein yarn formed from said elastomeric fiber has a tenacity at break of at least 0.6 cN/dtex, a break elongation of at least 400% and an unload modulus at 300% elongation of at least 27 mg/dtex.

2. The method of claim 1, wherein said elastomeric fiber is spandex.

3. The method of claim 1, wherein said polymeric glycol is a copolymer of tetrahydrofuran and at least one member of the group consisting of ethylene oxide, propylene oxide, trimethylene oxide, 3-methyltetrahydrofuran, and combinations thereof.

4. The method of claim 1, wherein said diisocyanate includes at least one diisocyanate selected from the group consisting of 4,4'-methylene bis(phenyl isocyanate), 2,4'-methylene bis(phenyl isocyanate) 1-isocyanato-4-[(4-isocyanatophenyl)methyl]benzene, 1-isocyanato-2-[(4-cyanatophenyl)methyl]benzene, bis(4-isocyanatocyclohexyl)methane, 5-isocyanato-1-(isocyanatomethyl)-1,3,3-trimethylcyclohexane, 1,3-diisocyanato-4-methyl-benzene, 2,2'-toluenediisocyanate, 2,4'-toluenediisocyanate, and mixtures thereof.

5. The method of claim 1, wherein said chain extender composition includes at least one diol or diamine chain extender.

6. The method of claim 1, wherein said chain extender composition includes at least one diamine chain extender selected from the group consisting of hydrazine; 1,2-ethylenediamine; 1,4-butanediamine; 1,2-butanediamine; 1,3-butanediamine; 1,3-diamino-2,2-dimethylbutane; 1,6-hexamethylenediamine; 1,12-dodecanediamine; 1,2-propanediamine; 1,3-propanediamine; 2-methyl-1,5-pentanediamine; 1-amino-3,3,5-trimethyl-5- aminomethylcyclohexane; 2,4-diamino-1-methylcyclohexane; N-methylamino-bis(3-propylamine); 1,2-cyclohexanediamine; 1,4-cyclohexanediamine; 4,4'-methylene-bis(cyclohexylamine); isophorone diamine; 2,2-dimethyl-1,3-propanediamine; meta-tetramethylxylenediamine; 1,3-diamino-4-methylcyclohexane; 1,3-cyclohexane-diamine; 1,1-methylene-bis(4,4'-diaminohexane); 3-aminomethyl-3,5,5-trimethylcyclohexane; 1,3-pentanediamine (1,3-diaminopentane); m-xylylene diamine and combinations thereof.

7. The method of claim 1, wherein said solution further comprises a blocking agent.

8. The method of claim 1, wherein said solution further comprises at least one additive selected from the group consisting of anti-oxidants, UV stabilizers, colorants, pigments, cross-linking agents, phase change materials, antimicrobials, minerals, microencapsulated additives, nanoparticles (i.e., silica or carbon), nano-clay, calcium carbonate, talc, flame retardants, antitack additives, chlorine degradation resistant additives, vitamins, medicines, fragrances, electrically conductive additives, dyeability and/or dye-assist agents and combinations thereof.

9. The method of claim 1, wherein said solution further comprises an additive selected from the group consisting of adhesion promoters, anti-static agents, anti-creep agents, optical brighteners, coalescing agents, electroconductive additives, luminescent additives, lubricants, organic and inorganic fillers, preservatives, texturizing agents, thermochromic additives, insect repellants, and wetting agents, stabilizers (hindered phenols, zinc oxide, hindered amine), slip agents (silicone oil) and combinations thereof.

10. The method of claim 1, wherein said solution further comprises an additive that provides a beneficial property selected from the group consisting of dyeability, hydrophobicity (i.e., polytetrafluoroethylene (PTFE)), hydrophilicity (i.e., cellulose), friction control, chlorine resistance, degradation resistance (i.e., antioxidants), adhesiveness and/or fusibility (i.e., adhesives and adhesion promoters), flame retardance, antimicrobial behavior (silver, copper, ammonium salt), barrier, electrical conductivity (carbon black), tensile properties, color, luminescence, recyclability, biodegradability, fragrance, tack control (i.e., metal stearates), tactile properties, set-ability, thermal regulation (i.e., phase change materials), nutriceutical, delustrant such as titanium dioxide, stabilizers such as hydrotalcite, a mixture of huntite and hydromagnesite, UV screeners, and combinations thereof.

* * * * *